(12) United States Patent
Wang et al.

(10) Patent No.: US 10,587,320 B2
(45) Date of Patent: Mar. 10, 2020

(54) CONFIGURABLE BEAM FAILURE EVENT DESIGN

(71) Applicant: AT&T Intellectual Property I, L.P., Atlanta, GA (US)

(72) Inventors: Xiaoyi Wang, Austin, TX (US); Salam Akoum, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/574,365

(22) Filed: Sep. 18, 2019

(65) Prior Publication Data
US 2020/0014440 A1 Jan. 9, 2020

Related U.S. Application Data

(60) Division of application No. 16/250,031, filed on Jan. 17, 2019, now Pat. No. 10,469,147, which is a
(Continued)

(51) Int. Cl.
*H04B 7/06* (2006.01)
*H04B 7/0408* (2017.01)
(Continued)

(52) U.S. Cl.
CPC .......... *H04B 7/061* (2013.01); *H04B 7/0408* (2013.01); *H04B 7/0617* (2013.01);
(Continued)

(58) Field of Classification Search
CPC .... H04B 7/061; H04B 7/2041; H04B 7/0408; H04B 7/0617; H04W 76/19; H04W 16/28
See application file for complete search history.

(56) References Cited

U.S. PATENT DOCUMENTS 6,842,630 B2  1/2005  Periyalwar
7,826,471 B2  11/2010 Wilson et al.
(Continued)

FOREIGN PATENT DOCUMENTS

EP    2 916 581 A1    9/2015
KR    10-1473409 B1   12/2014
WO    2017/023370 A1  2/2017

OTHER PUBLICATIONS

Giordani et al., "Uplink-Based Framework for Control Plane Applications in 5G mmWave Cellular Networks" Oct. 16, 2016 University of Padova 31 pages.
(Continued)

*Primary Examiner* — Dominic E Rego
(74) *Attorney, Agent, or Firm* — Amin, Turocy & Watson, LLP

(57) ABSTRACT

Determining when beam failure of a beam pair link has occurred is provided. Transient obstructions, and other interference effects can cause the failure of a beam pair link which can comprise a transmit beam and a receive beam associated with respective antennas on a transmitter and receiver. Switching to another beam pair link can cause decrease throughput and efficiency however, so the improved mechanism for determining a failure includes taking into consideration the importance of the beam pair link before initiating the beam recovery process. The configurable beam failure protocol defined herein considers the relative importance of the configured beam pair links when declaring the beam pair link a failure. The importance of the beam pair link can be based on the amount of downlink control information in the transmission.

20 Claims, 10 Drawing Sheets

Related U.S. Application Data continuation of application No. 15/632,837, filed on Jun. 26, 2017, now Pat. No. 10,211,898.

(51) Int. Cl.
  *H04B 7/204* (2006.01)
  *H04W 76/19* (2018.01)
  *H04W 16/28* (2009.01)

(52) U.S. Cl.
  CPC .......... *H04B 7/2041* (2013.01); *H04W 16/28* (2013.01); *H04W 76/19* (2018.02)

(56) References Cited

U.S. PATENT DOCUMENTS

| | | | |
|---|---|---|---|
| 8,126,021 | B2 | 2/2012 | Wang et al. |
| 8,830,818 | B2 | 9/2014 | Damnjanovic |
| 8,848,641 | B2 | 9/2014 | Fong et al. |
| 8,982,693 | B2 | 3/2015 | Krishnamurthy et al. |
| 8,995,359 | B2 | 3/2015 | Dayal et al. |
| 8,995,436 | B2 | 3/2015 | Kong et al. |
| 9,198,070 | B2 | 11/2015 | Krishnamurthy et al. |
| 9,521,565 | B2 | 12/2016 | Tenny et al. |
| 9,614,600 | B2 | 4/2017 | Nagata et al. |
| 9,634,808 | B2 * | 4/2017 | Nagata .................. H04L 5/0051 |
| 10,057,025 | B2 | 8/2018 | Park et al. |
| 2005/0288028 | A1 * | 12/2005 | Lim ...................... H04W 36/18 455/442 |
| 2006/0003767 | A1 * | 1/2006 | Kim ...................... H04W 36/18 455/436 |
| 2006/0209734 | A1 * | 9/2006 | Son ........................ H04L 47/10 370/312 |
| 2008/0019279 | A1 | 1/2008 | Kim et al. |
| 2011/0170422 | A1 | 7/2011 | Hu et al. |
| 2013/0039284 | A1 | 2/2013 | Marinier et al. |
| 2013/0039345 | A1 * | 2/2013 | Kim .................... H04W 72/046 370/332 |
| 2013/0065622 | A1 * | 3/2013 | Hwang ................ H04W 16/28 455/500 |
| 2013/0153298 | A1 | 6/2013 | Pietraski et al. |
| 2013/0215844 | A1 | 8/2013 | Seol et al. |
| 2014/0341048 | A1 | 11/2014 | Sajadiesh et al. |
| 2015/0255032 | A1 | 9/2015 | Xu |
| 2016/0295462 | A1 | 10/2016 | Lunden et al. |
| 2016/0301506 | A1 | 10/2016 | Halbauer et al. |
| 2017/0251444 | A1 | 8/2017 | Huang et al. |
| 2017/0251465 | A1 * | 8/2017 | Andersson ............ H04L 5/0037 |
| 2017/0302355 | A1 * | 10/2017 | Islam .................. H04B 7/0639 |
| 2018/0115990 | A1 | 4/2018 | Abedini et al. |
| 2018/0131434 | A1 | 5/2018 | Islam et al. |
| 2018/0132252 | A1 | 5/2018 | Islam et al. |
| 2018/0191422 | A1 * | 7/2018 | Xia ...................... H04B 7/0834 |
| 2018/0241452 | A1 * | 8/2018 | Akkarakaran .... H04W 72/0446 |
| 2019/0261256 | A1 * | 8/2019 | Wang ................... H04L 5/0053 |
| 2019/0261344 | A1 * | 8/2019 | Grant ................... H04B 7/022 |

OTHER PUBLICATIONS

Non-Final Office Action received for U.S. Appl. No. 15/632,837 dated May 30, 2018, 18 pages.

International Search Report and Written Opinion dated Jul. 25, 2018 for PCT Application No. PCT/US2018/032458, 12 pages.

3rd Generation Partnership Project; Technical Specification Group Radio Access Network; Study on New Radio echnology Physical Layer Aspects {Release 14), 3GPP Standard; Technical Report; 3GPP TR 38.802, V14.1.0, Jun. 23, 2017, pp. 1-143.

Non-Final Office Action received for U.S. Appl. No. 16/250,031 dated Mar. 7, 2019, 18 pages.

\* cited by examiner

CONFIGURABLE BEAM FAILURE EVENT DESIGN

RELATED APPLICATION

The subject patent application is a divisional of, and claims priority to each of, U.S. patent application Ser. No. 16/250,031, filed Jan. 17, 2019, and entitled "CONFIGURABLE BEAM FAILURE EVENT DESIGN," which is a continuation of U.S. patent application Ser. No. 15/632,837 (now U.S. Pat. No. 10,211,898), filed Jun. 26, 2017, and entitled "CONFIGURABLE BEAM FAILURE EVENT DESIGN," the entireties of which applications are hereby incorporated by reference herein.

TECHNICAL FIELD

The present application relates generally to the field of mobile communication and, more specifically, to determining when a beam failure of a beam pair link has occurred in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
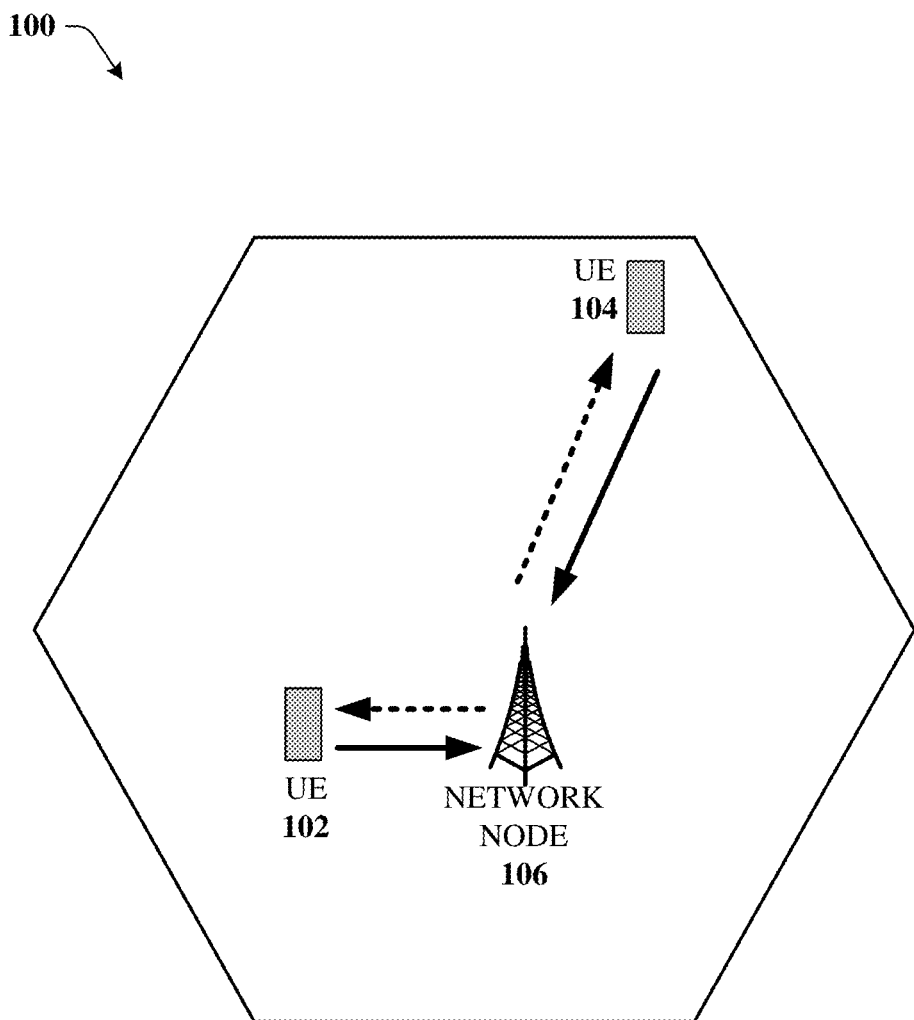
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for determining when beam failure of a beam pair link has occurred. Transient obstructions, and other interference effects can cause the failure of a beam pair link which can comprise a transmit beam and a receive beam associated with respective antennas on a transmitter and receiver. Switching to another beam pair link can cause decrease throughput and efficiency however, so the improved mechanism for determining a failure includes taking into consideration the importance of the beam pair link before initiating the beam recovery process. The configurable beam failure protocol defined herein considers the relative importance of the configured beam pair links when declaring the beam pair link a failure. The importance of the beam pair link can be based on the amount of downlink control information in the transmission.

In various embodiments, a user equipment device can comprise a processor and a memory that stores executable instructions that, when executed by the processor facilitate performance of operations. The operations can comprise determining that a reference signal associated with a beam pair link is below a first value determined by a predefined criterion associated with a strength of the reference signal, wherein the beam pair link is a transmission stream between a transmitter antenna and a receiver antenna. The operations can also comprise determining a number of decoding candidates associated with the transmission stream. The operations can also comprise, in response to the number of decoding candidates being determined to be above a second value, initiating a beam failure protocol.

In another embodiment, method comprises determining, by a device comprising a processor, that a transmission received from a base station device transmitter antenna comprises a predefined amount of downlink control information. The method can also comprise determining, by the device, that a reference signal associated with the transmission does not satisfy a predefined criterion related to signal quality of the reference signal. The method can also comprise determining, by the device, that a beam failure of a beam pair link between the base station device transmitter antenna and a receiver antenna has occurred in response to the reference signal being determined not to satisfy the predefined criterion related to signal quality.

In another embodiment machine-readable storage medium, comprising executable instructions that, when executed by a processor of a device, facilitate performance of operations. The operations can comprise determining that a reference signal associated with a beam pair link is below a predefined signal to noise ratio level, wherein the beam pair link is data stream between a transmitter antenna and a receiver antenna. The operations can also comprise determining a number of decoding candidates associated with the data stream. The operations can also comprise determining that a beam failure has occurred in response to determining the number of decoding candidates are above a defined number. The operations can also comprise sending a beam recovery request to a base station device associated with the transmitter antenna in response to determining the beam failure has occurred.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC.

However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, UE 102 or 104 can determine when a beam failure of a beam pair link has occurred and determine whether to initiate a beam recovery process based on the importance of the beam pair link, or based on the amount of downlink control information or uplink control information being passed by the beam pair link. Temporary interference cause by blockage (due to the millimeter wave wavelengths of the transmission medium) can render one or more beam pair links (transmission streams from an antenna on a transmitter to a antenna on a receiver) of MIMO transmission disabled. This can prevent the decoding of the blind decoding candidates in the transmission and require retransmission. If only a small amount of downlink control information is missing however, the transmission process can proceed, without retransmission of the missing downlink control information. Therefore, by taking into consideration the importance of the control resource set (the set of blind decoding candidates in the transmission carrying the downlink control information) unnecessary beam recovery procedures can be avoided.

Figure 2:
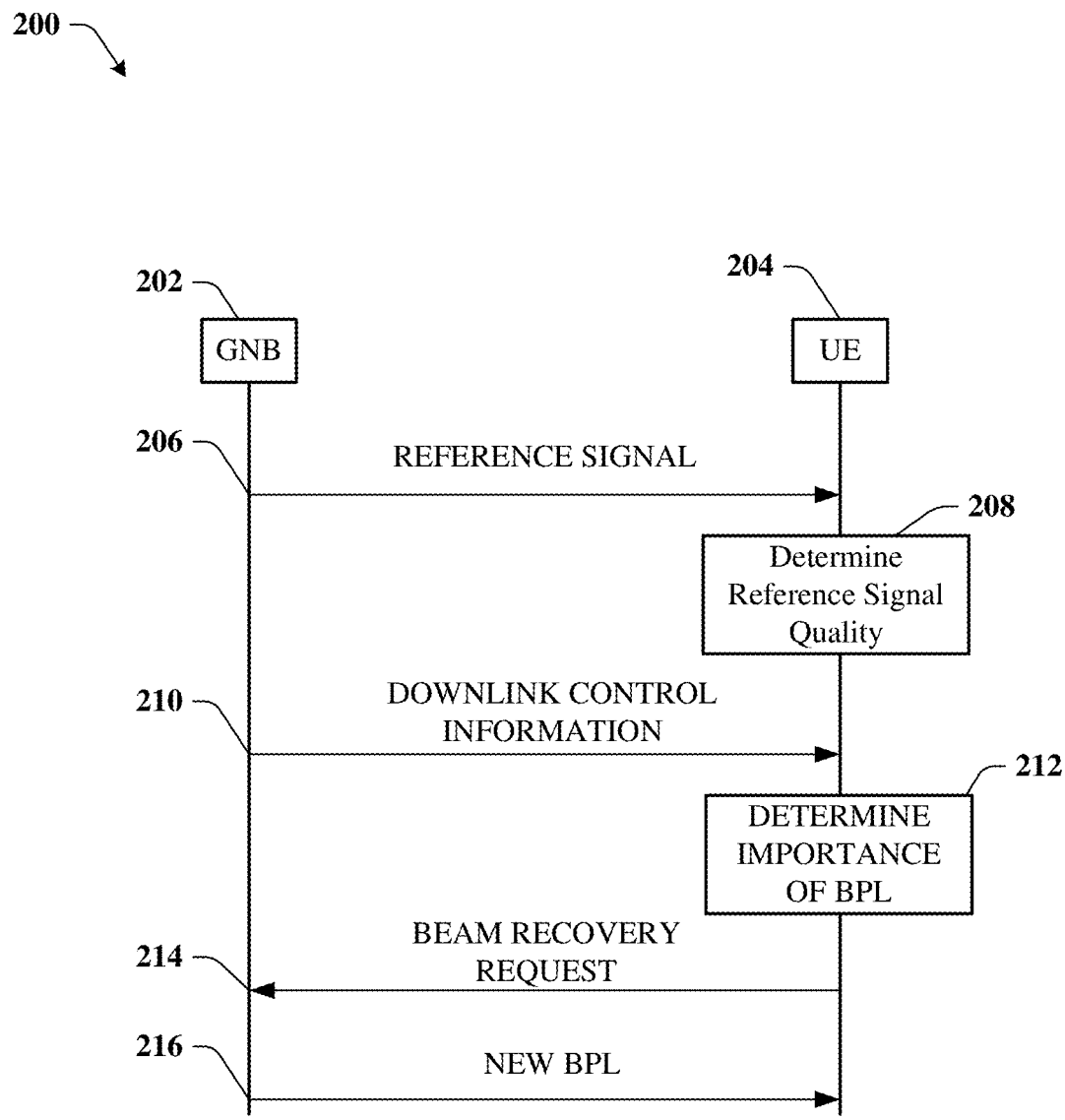
FIG. 2 illustrates an example block diagram showing a message sequence chart in accordance with various aspects and embodiments of the subject disclosure.

Turning now to FIG. 2, illustrated is an example block diagram showing a message sequence chart 200 in accordance with various aspects and embodiments of the subject disclosure.

In an embodiment, a gNodeB (or other network node) 202 can issue a reference signal 206 that can be received by a UE 204. The reference signal can be beamformed in some embodiments, or non beamformed in other embodiments.

Based on the reference signal 106, the UE 104 can measure the channel response, and determine channel state information (CSI) to give as feedback to the gNodeB 202. The channel state information can also provide an indication of the reference signal quality at 208 and can include a channel quality indicator, precoding matrix index, or advanced PMI. This channel state information can refer to the known channel properties of the communication link between the gNodeB 202 and the UE 204. The channel properties can reflect how the signal propagates from the transmitter to the receiver and represents the combined effect of, for example, scattering, fading, and power decay with distance.

Based, on channel state information, the gNodeB 202 can then send downlink control information (DCI) 210 to the UE 204 which enables the UE to receive data over a data traffic channel, or uplink control information which can facilitate configuring the UE 204 to send data back to the gNodeB 202. The downlink link control information and/or uplink control information can be encoded in one or more radio resource elements in a transmission. The physical resource elements can correspond to one subcarrier and/or one OFDM symbol. The UE 204 can perform blind decoding of a set of PDCCH candidates that may contain the DCI 110. The number of candidates blindly decoded can be based on the search space and/or aggregation level of the channel. In an embodiment, each beam pair link can transmit a control resource set (group of blind decoding candidates). The control resource sets can have varying numbers of blind decoding candidates at different aggregation levels (the number of physical spaces or radio resource elements that DCI information can be mapped to). Higher aggregation levels mean that the same amount of DCI is mapped to more locations, which increases the robustness of the transmission.

The relative importance of the beam pair link can be determined at 212 based on the control resource set the beam pair link is associated with. A control resource set is a set of resource elements where each UE attempts to blindly decode the downlink control information. A user can have one or more control resource sets. Each control resource set can be associated with a search space, and the search space can include aggregation level(s) and number of decoding candidates for each aggregation level.

In an embodiment, UE 204 can be configured with multiple control resource sets. Each control resource set is associated with certain number of blind decoding candidates. (The number of blind decoding candidates may be implicitly decided by the size of control resource sets in terms of resource elements A resource element can be the smallest modulation structure, or data unit. Each control resource set is associated with a set of beam pair links where each beam pair link includes a transmitter beam and a receiver beam. Each set of beam pair links is associated with a reference signal resource which is used to estimate the quality of the set of beam pair link.

In an embodiment, a beam failure event can be defined as "more than N effective blind decoding candidates failed" and the value of N is configured by network depending on local conditions. When the reference signal resource (maybe CSI-RS or SS-block) corresponding to a control resource set failed, all the blind decoding candidates associated with the control resource set are also considered to have failed. In some embodiments, a beam failure event can be based on the aggregation level of the control resource set. For instance, a beam failure event can be defined as "more than N effective blind decoding candidates with a certain aggregation level that have failed".

After determining that the beam failure event has occurred, the UE 204 can request a beam recovery at 214, and at 216, the gNodeb 202 can initiate a new beam pair link using a different set of antennas.

As an example, UE 204 can be configured with 2 control resource sets (of downlink control information). Control resource set 1 associated with a first beam pair link has 12 blind decoding candidates and control resource set 2 has 2 blind decoding candidates. So, if the set of beam pair links associated with control resource set 1 failed (according to the measurement associated RS resource), the total number of failed blind decoding candidates is 12. If the reference signal associated with control resource set 2 failed or is below a predetermined signal strength or signal to noise ratio, the total number of failed blind decoding candidates is 2. If the network has as a threshold of 4 blind decoding candidates failed to declare a beam failure, then the failure of the first beam pair link would trigger the failure, but the failure of beam pair link 2 (associated with control resource set 2) would not trigger the failure.

In an embodiment when considering the aggregation level. if UE 204 can be configured with 2 control resource sets. Control resource set 1 has 12 blind decoding candidates, where 6 of the blind decoding aggregates are at aggregation level 2 and another 6 blind decoding candidates are at aggregation 4. While control resource set 2 has 2 blind decoding candidates at aggregation 4. And the failed blind decoding candidate is configured as aggregation 4 only. So if control resource set 2 failed, then the total number of failed blind decoding candidate would be 2 while if control resource set 1 failed, the total number of blind decoding candidates would be 6 which would trigger a failure event.

Figure 3:
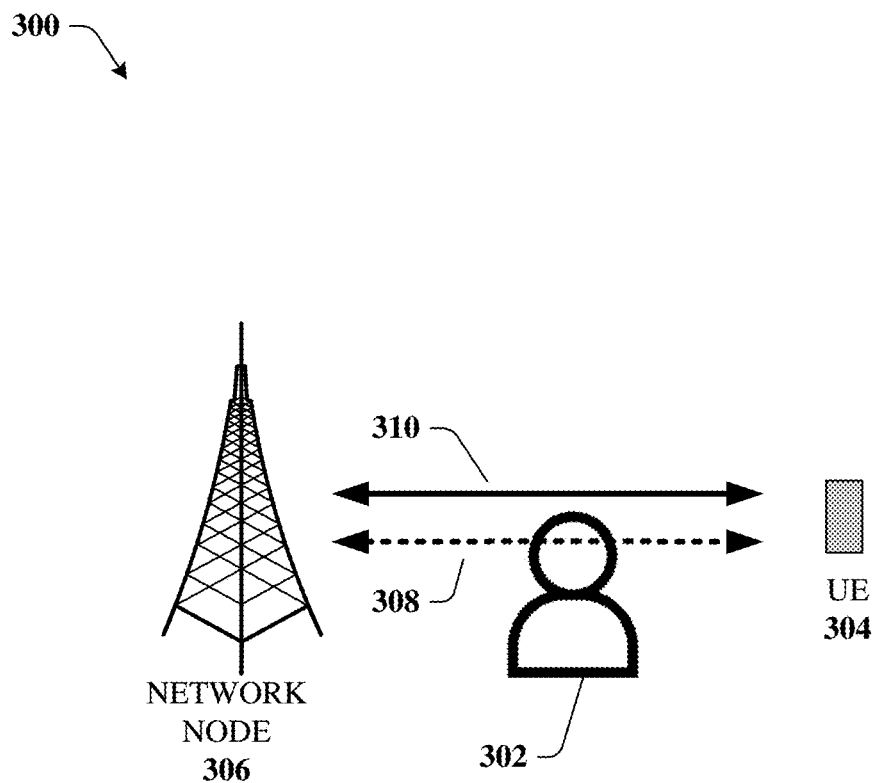
FIG. 3 illustrates an example block diagram of a new beam pair link from the same network node in accordance with various aspects and embodiments of the subject disclosure.

Turning now to FIG. 3, illustrated is an example block diagram 300 of a new beam pair link from the same network node in accordance with various aspects and embodiments of the subject disclosure.

In an embodiment, a beam pair link 308 between network node 306 and UE 304 can be blocked by object 302 (in the shape of a person, but could be any object capable of attenuating a millimeter wave transmission between the network node 306 and UE 304). After determining that the reference signal associated with the beam pair link 308 is below a threshold signal quality (e.g., as measured by signal strength, signal to interference plus noise ratio, etc.), and after determining that the control resource set associated with the beam pair link 308 is of enough significance or importance, or comprises a predetermined number of blind decoding candidates at a certain aggregation level, the UE 304 can determine that the beam pair link 308 has experienced a failure event, and will send a request for beam recovery to the network node 306. A new beam pair link 310 can be formed to retransmit the downlink control information.

Figure 4:
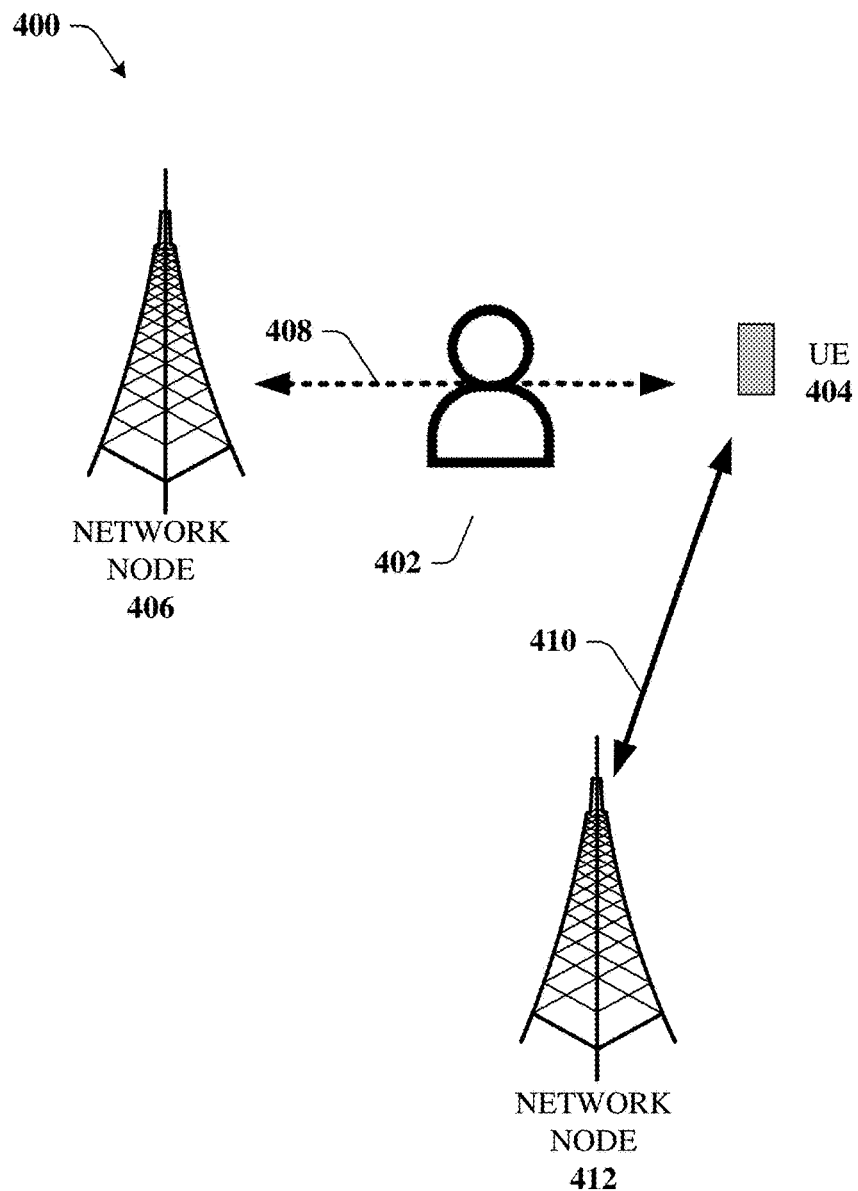
FIG. 4 illustrates an example block diagram of a new beam pair link from a different network node in accordance with various aspects and embodiments of the subject disclosure.

Turning now to FIG. 4, illustrated is an example block diagram of a new beam pair link from a different network node in accordance with various aspects and embodiments of the subject disclosure.

In an embodiment, a beam pair link 408 between network node 406 and UE 404 can be blocked by object 402 (in the shape of a person, but could be any object capable of attenuating a millimeter wave transmission between the network node 406 and UE 404). After determining that the reference signal associated with the beam pair link 408 is below a threshold signal quality (e.g., as measured by signal strength, signal to interference plus noise ratio, etc.), and after determining that the control resource set associated with the beam pair link 408 is of enough significance or importance, or comprises a predetermined number of blind decoding candidates at a certain aggregation level, the UE 404 can determine that the beam pair link 408 has experienced a failure event, and will send a request for beam recovery. The request can either be sent back to network node 406 or network node 412 and the new beam pair link to the network node 306. A new beam pair link 410 between network node 412 and UE 404 can be formed to retransmit the downlink control information.

The UE 404, network node 406, or mobile network can determine to introduce another network node (e.g., network node 412) if there are no suitable antenna pairs on network node 406 and UE 404 to establish a new beam pair link. This can occur of the object 402 is causing a significant enough blockage to interfere with the antennas of the network node 406.

Figure 5:
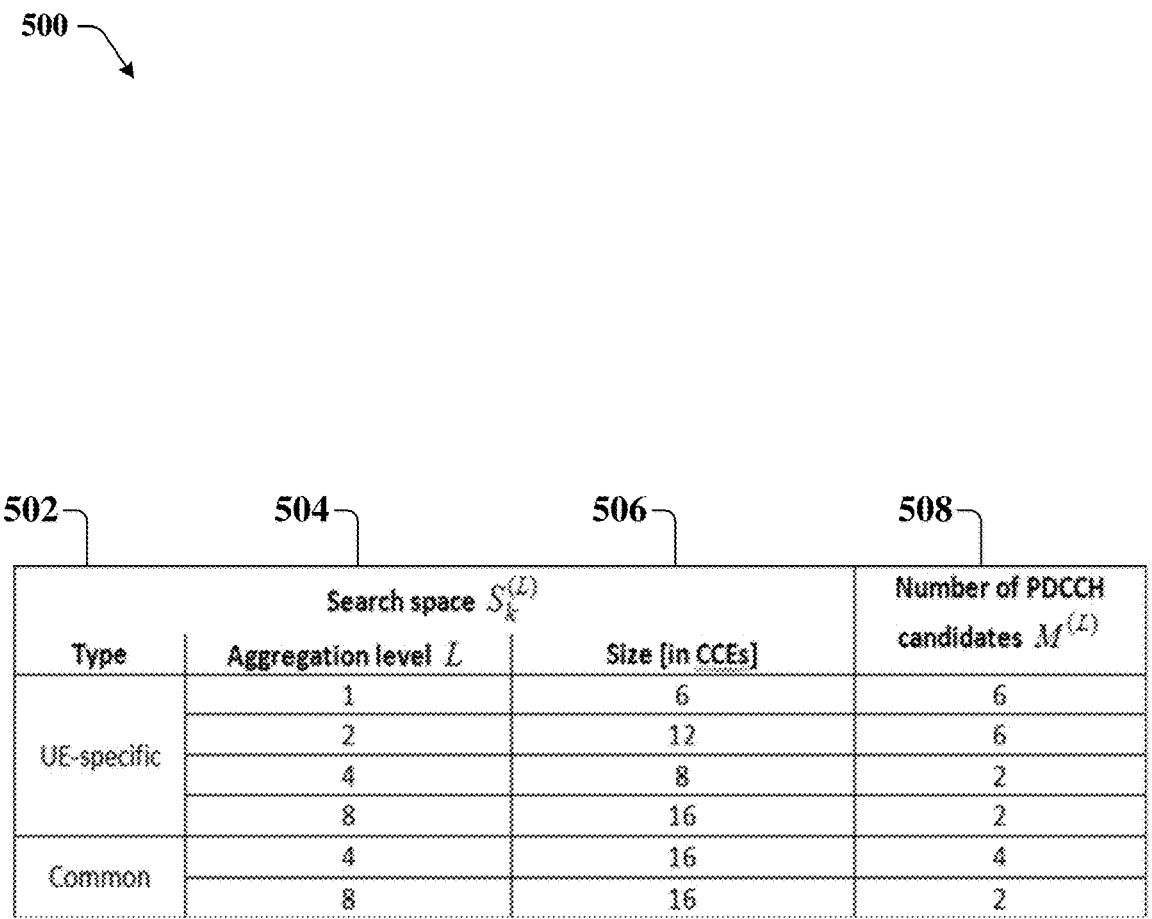
FIG. 5 illustrates an example table showing aggregation levels for blind decoding in accordance with various aspects and embodiments of the subject disclosure.

Turning now to FIG. 5, illustrated is an example table showing aggregation levels for blind decoding in accordance with various aspects and embodiments of the subject disclosure There can be different types 502 of aggregation levels 504, where each aggregation level 504 has a different size 506 and number of PDCCH candidate 508. The size 506 is derived by multiplying the number 508 of PDCCH candidates by the aggregation level 504.

For UE specific search spaces, there can be four aggregation levels, 1, 2, 4, and 8, with separate sizes and candidates per aggregation level. Each of the different aggregation levels can have different priority lists to facilitate the early termination of blind decoding by the UE when it receives the transmission from the base station device.

In various embodiments, the aggregation level can be configured by the base station device or the network for the UE based on a variety of factors, including the link quality of the UE and other quality of service concerns. For instance, a UE that is on a cell edge can use an aggregation level that is higher, such as level 8 since the number of PDCCH candidates are smaller, which can facilitate a lower code rate.

By taking into consideration the aggregation level of the control resource set, the importance of the beam pair link can be determined in another way. There are different aggregation levels that a PDCCH has (aggregation level is defined as the number of control channel elements aggregated for transmission for each PDCCH). There can be 4 possible aggregation levels (1, 2, 4, or 8). The higher the aggregation level, means the more likely that the UE will decode the DCI, as it occupies more CCEs, hence more bits, and uses a more robust coding. So for example channels that carry system information have a higher aggregation level.

Figure 6:
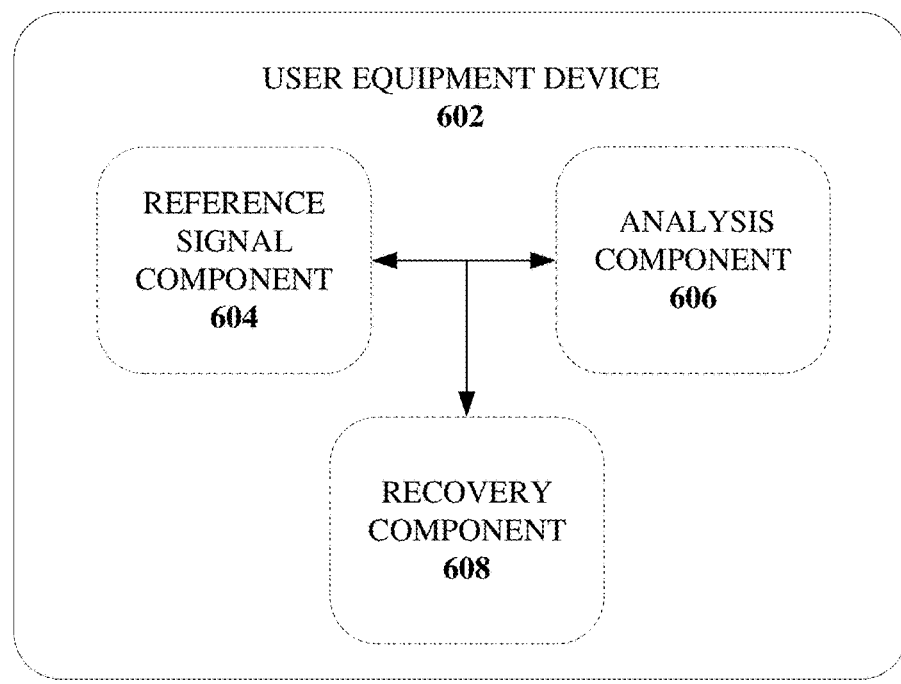
FIG. 6 illustrates an example block diagram of a user equipment device in accordance with various aspects and embodiments of the subject disclosure.

Turning now to FIG. 6, illustrated an example block diagram 600 of a user equipment device 602 in accordance with various aspects and embodiments of the subject disclosure.

User equipment device 602 can include a reference signal component 604 that receives the reference signal and determines whether the reference signal quality is below a predetermined threshold, or the signal to noise ratio is below a threshold. The reference signal component 604 can determine that a reference signal associated with a beam pair link is below a first value determined by a predefined criterion associated with a strength of the reference signal, wherein the beam pair link is a transmission stream between a transmitter antenna and a receiver antenna.

An analysis component 606 can be provided to determine an importance of the beam pair link associated with the reference signal. The relative importance of the beam pair link can be determined by the analysis component 606 based on the control resource set the beam pair link is associated with. A control resource set is a set of resource elements where each UE attempts to blindly decode the downlink control information. A user can have one or more control resource sets. Each control resource set can be associated with a search space, and the search space can include aggregation level(s) and number of decoding candidates for each aggregation level.

In an embodiment, user equipment device 602 can be configured with multiple control resource sets. Each control resource set is associated with certain number of blind decoding candidates. (The number of blind decoding candidates may be implicitly decided by the size of control resource sets in terms of resource elements A resource element can be the smallest modulation structure, or data unit. Each control resource set is associated with a set of beam pair links where each beam pair link includes a transmitter beam and a receiver beam. Each set of beam pair links is associated with a reference signal resource which is used to estimate the quality of the set of beam pair link.

In an embodiment, a beam failure event can be defined as "more than N effective blind decoding candidates failed" and the value of N is configured by network depending on local conditions. When the reference signal resource (maybe CSI-RS or SS-block) corresponding to a control resource set failed, all the blind decoding candidates associated with the control resource set are also considered to have failed. In some embodiments, a beam failure event can be based on the aggregation level of the control resource set. For instance, a beam failure event can be defined as "more than N effective blind decoding candidates with a certain aggregation level that have failed".

In response to determining that a beam failure event has occurred, the user equipment device 602 will initiate the beam failure protocol in which the recovery component initiates a transmission of a beam recovery request to a base station device associated with the transmitter antenna or another base station device. In response to sending the beam recovery request, the base station can initiate a new beam pair link and retransmit the downlink or uplink control information that was in the failed transmission.

Figure 7:
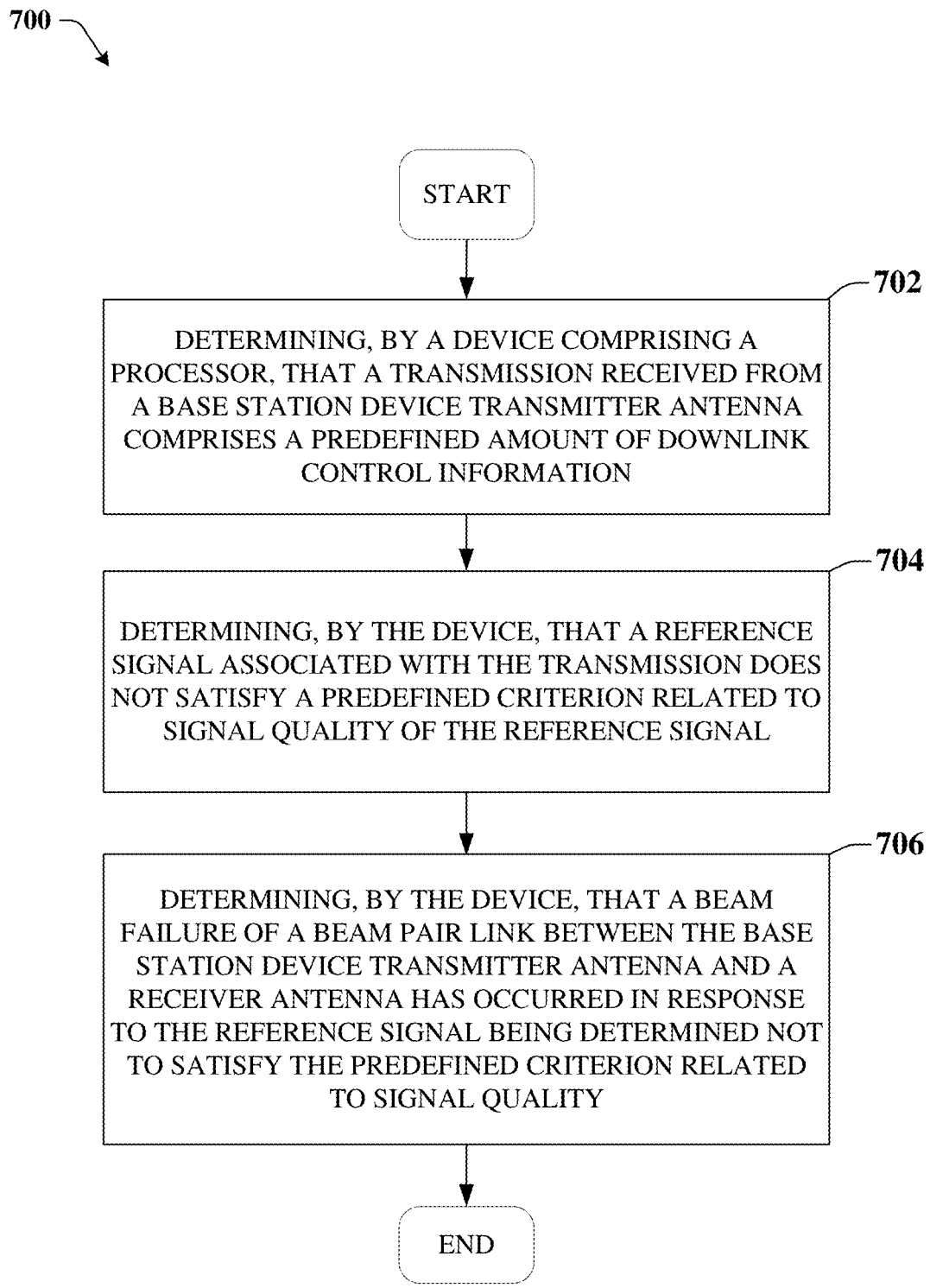
FIG. 7 illustrates an example method for determining that a beam failure has occurred in accordance with various aspects and embodiments of the subject disclosure.
Figure 8:
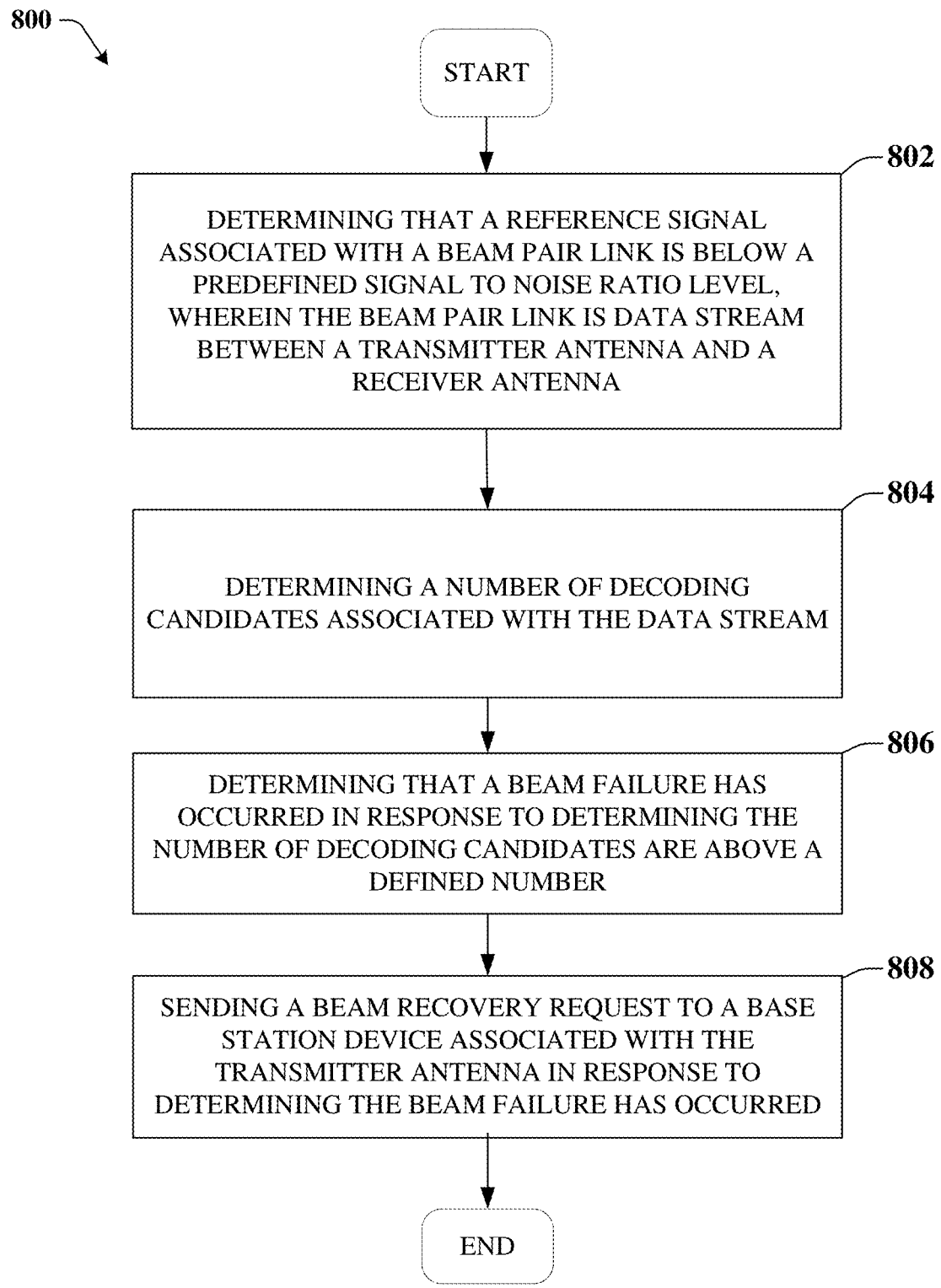
FIG. 8 illustrates an example method for determining that a beam failure has occurred in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for determining that a beam failure has occurred in accordance with various aspects and embodiments of the subject disclosure.

Method 700 can begin at 702 where the method includes determining, by a device comprising a processor, that a transmission received from a base station device transmitter antenna comprises a predefined amount of downlink control information.

At 704, the method includes determining, by the device, that a reference signal associated with the transmission does not satisfy a predefined criterion related to signal quality of the reference signal.

At 706, the method includes determining, by the device, that a beam failure of a beam pair link between the base station device transmitter antenna and a receiver antenna has occurred in response to the reference signal being determined not to satisfy the predefined criterion related to signal quality.

FIG. 8 illustrates an example method 800 for determining that a beam failure has occurred in accordance with various aspects and embodiments of the subject disclosure.

Method 800 can begin at 802 wherein the method includes determining that a reference signal associated with a beam pair link is below a predefined signal to noise ratio level, wherein the beam pair link is data stream between a transmitter antenna and a receiver antenna.

At 804, the method can include determining a number of decoding candidates associated with the data stream.

At 806, the method can include determining that a beam failure has occurred in response to determining the number of decoding candidates are above a defined number.

At 808, the method can include sending a beam recovery request to a base station device associated with the transmitter antenna in response to determining the beam failure has occurred.

Figure 9:
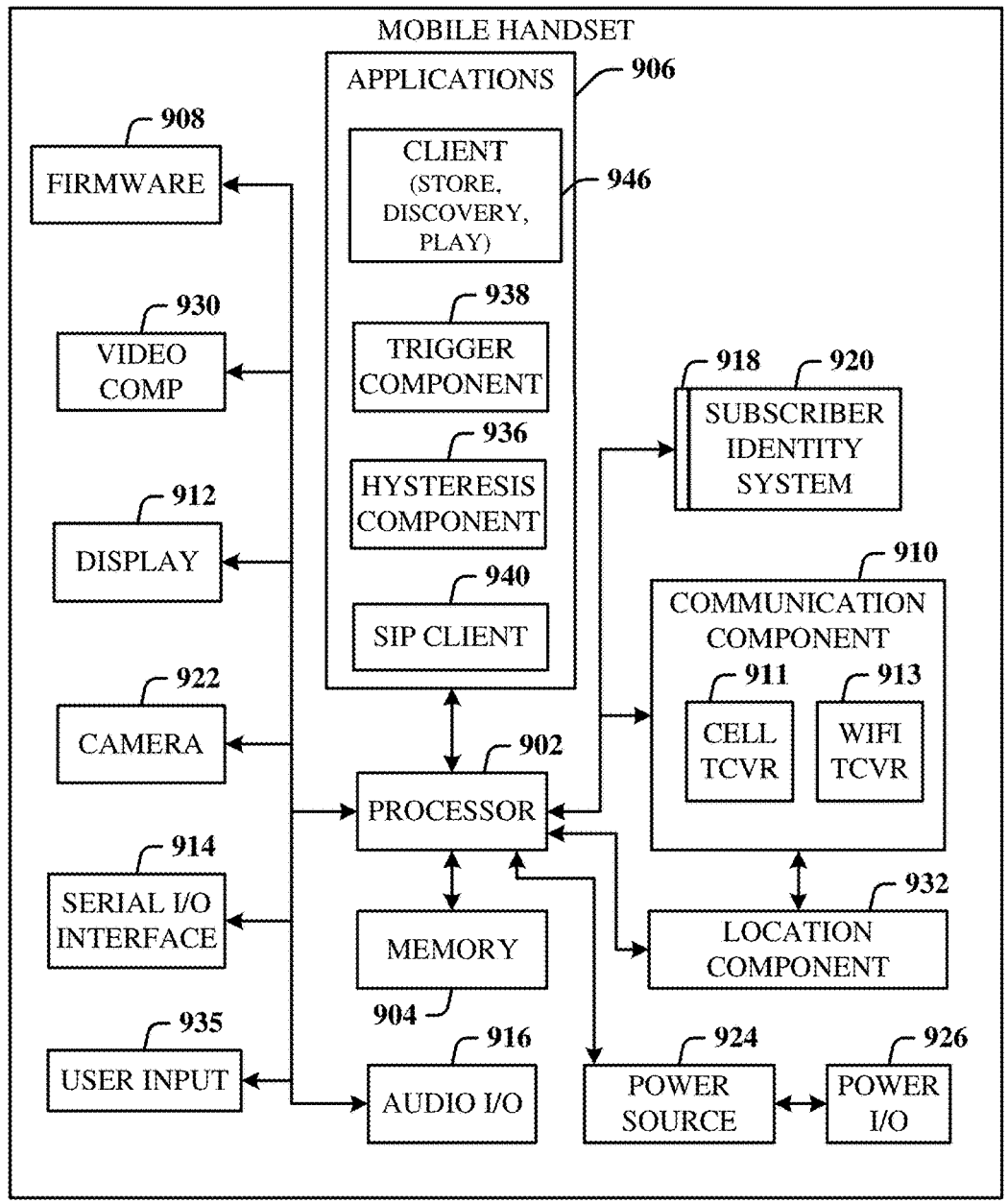
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
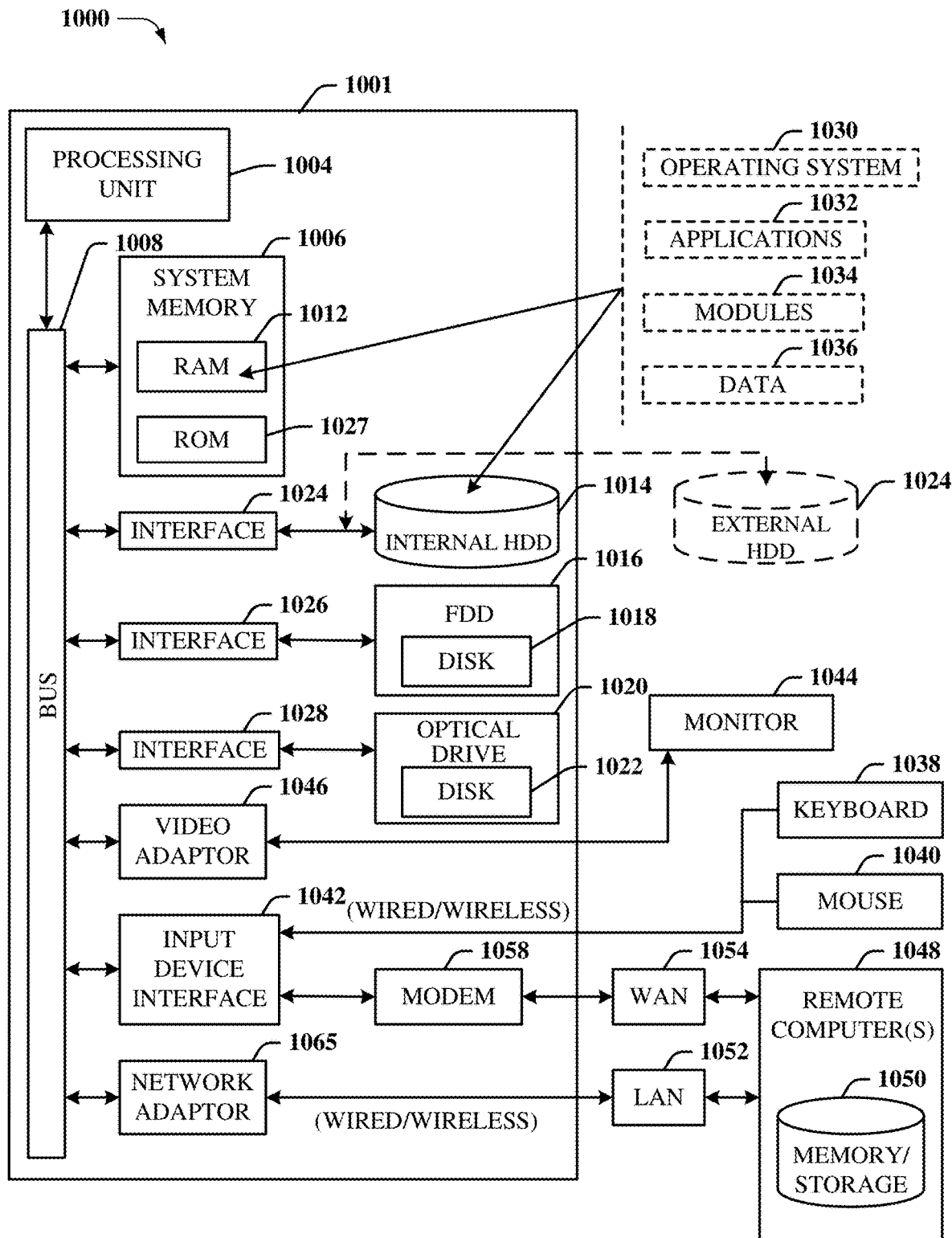
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   determining, by a device comprising a processor, that a transmission received from a transmitter antenna of a base station device comprises a defined amount of downlink control information;
   determining, by the device, that a reference signal associated with the transmission does not satisfy a defined criterion related to a signal quality of the reference signal; and
   determining, by the device, that a beam failure of a beam pair link between the transmitter antenna of the base station device and a receiver antenna has occurred in response to the reference signal being determined not to satisfy the defined criterion related to the signal quality.

2. The method of claim 1, wherein the determining that the transmission comprises the defined amount of downlink control information is based on a number of decoding candidates determined to be represented in the transmission.

3. The method of claim 2, wherein the determining that the beam failure of the beam pair link between the transmitter antenna and the receiver antenna has occurred further comprises:
   determining that the beam failure of the beam pair link has occurred in response to the number of decoding candidates being at least at a defined aggregation level.

4. The method of claim 1, wherein the determining that the transmission comprises the defined amount of downlink control information is based on a result of determining a number of resource elements associated with the transmission.

5. The method of claim 1, wherein the base station device is a first base station device, and the method further comprises:
   sending, by the device, a beam recovery request to a second base station device in response to determining that the beam failure of the beam pair link has occurred.

6. The method of claim 5, wherein the transmitter antenna is a first transmitter antenna, wherein the transmission is a first transmission, and wherein the method further comprises:
   in response to the sending the beam recovery request, receiving, by the device, a second transmission from a second transmitter antenna of the second base station device.

7. The method of claim 5, wherein the transmitter antenna is a first transmitter antenna, wherein the transmission is a first transmission, and wherein the method further comprises:
in response to sending the beam recovery request, receiving, by the device, a second transmission from a second transmitter antenna of the second base station device, wherein the second transmission comprises the defined amount of downlink control information.

8. The method of claim 1, wherein the base station device is associated with a first base station device, and wherein the method further comprises:
initiating, by the device, a beam failure protocol.

9. A device, comprising:
a processor; and
a memory that stores executable instructions that, when executed by the processor, facilitate performance of operations, comprising:
determining that a transmission received from a base station device comprises a defined amount of control information;
determining that a reference signal quality associated with the transmission is below a value; and
determining that a beam failure of a beam pair link between the base station device and a receiver has occurred based on the reference signal quality being determined to be below the value.

10. The device of claim 9, wherein the determining that the transmission comprises the defined amount of control information is based on a number of decoding candidates determined to be in the transmission.

11. The device of claim 10, wherein the determining that the beam failure of the beam pair link between the base station device and the receiver has occurred further comprises:
determining that the beam failure of the beam pair link has occurred in response to the number of decoding candidates being determined to be at a defined aggregation level.

12. The device of claim 9, wherein the determining that the transmission comprises the defined amount of control information is based on a result of determining a number of resource elements associated with the transmission.

13. The device of claim 9, wherein the base station device is a first base station device, and wherein the operations further comprise:
sending a beam recovery request to a second base station device in response to the determining that the beam failure has occurred.

14. The device of claim 13, wherein the transmission is a first transmission, and wherein the operations further comprise:
in response to the sending the beam recovery request to the second base station device, receiving a second transmission from the second base station device.

15. The device of claim 9, wherein the base station device comprises a base station device transmitter antenna and wherein the operations further comprise:
sending a beam recovery request to a base station device receiver antenna.

16. A non-transitory machine-readable storage medium, comprising executable instructions that, when executed by a device comprising a processor, facilitate performance of operations, comprising:
determining that a transmission, received from a first base station device, comprises a defined amount of control information;
determining that a beam failure of a beam pair link between the first base station device and a receiver device has occurred based on a signal quality of a reference signal associated with the transmission not satisfying a defined criterion; and
sending a beam recovery request to a second base station device in response to the determining that the beam failure has occurred.

17. The non-transitory machine-readable storage medium of claim 16, wherein the determining that the transmission comprises the defined amount of control information is based on a number of decoding candidates determined to be in the transmission.

18. The non-transitory machine-readable storage medium of claim 17, wherein the determining that the beam failure of the beam pair link between the first base station device and the receiver device has occurred further comprises:
determining that the beam failure has occurred in response to the number of decoding candidates being determined to be at least at a defined aggregation level.

19. The non-transitory machine-readable storage medium of claim 16, wherein the determining that the transmission comprises the defined amount of control information is based on a result of determining a number of resource elements associated with the transmission.

20. The non-transitory machine-readable storage medium of claim 16, wherein the transmission is a first transmission, and wherein the operations further comprise:
in response to sending the beam recovery request, receiving a second transmission from the second base station device.

* * * * *